United States Patent [19]
Fukimoto et al.

[11] Patent Number: 5,329,512
[45] Date of Patent: Jul. 12, 1994

[54] TEMPERATURE DETECTION OF A MAGNETO-OPTIC RECORDING MEDIUM FOR CONTROLLING IRRADIATION OF AN ERASURE REGION

[75] Inventors: Atsushi Fukimoto, Kanagawa; Toshiki Udagawa; Shunji Yoshimura, both of Tokyo; Masumi Ono, Kanagawa; Kouichi Yasuda, Tokyo, all of Japan

[73] Assignee: Sony Corporation, Tokyo, Japan

[21] Appl. No.: 930,617

[22] PCT Filed: Oct. 19, 1991

[86] PCT No.: PCT/JP91/01437
§ 371 Date: Sep. 30, 1992
§ 102(e) Date: Sep. 30, 1992

[87] PCT Pub. No.: WO92/14244
PCT Pub. Date: Aug. 20, 1992

[30] Foreign Application Priority Data
Feb. 5, 1991 [JP] Japan .................. 3-035544

[51] Int. Cl.[5] .............. G11B 11/10; G11B 7/00
[52] U.S. Cl. .................... 369/121; 369/13; 369/100; 369/116; 360/59; 360/114
[58] Field of Search .......... 427/548, 130, 131; 369/121, 13, 100, 110, 275.2, 116; 360/59, 114

[56] References Cited
U.S. PATENT DOCUMENTS 5,208,799  5/1993  Nakao et al. .................. 369/110
5,218,581  6/1993  Ohta et al. ..................... 369/13
5,230,930  7/1993  Aratani et al. ................. 427/548

FOREIGN PATENT DOCUMENTS
01-143041  6/1989  Japan .
01-143042  6/1989  Japan .
01-179224  7/1989  Japan .
02-273355  11/1990  Japan .

OTHER PUBLICATIONS
Patent Abstracts of Japan, vol. 11, No. 389, Dec. 1987.

Primary Examiner—Paul M. Dzierzynski
Assistant Examiner—Kim-Kwok Chu

[57] ABSTRACT

A method for reproducing a magneto-optical recording medium the recording pits of which are erased or relieved with rise in temperature of the recording medium caused by radiation of a readout beam, or an optical recording medium the reflectance of which is changed with rise in temperature of the recording medium caused by radiation of the readout beam, in which changes in the size of an effective reproducing region due to the temperature of the magneto-optical or optical recording medium may be inhibited. To this end, a temperature sensor 20 for sensing the temperature of the magneto-optical disc 11, for example, is provided and the laser power or the external magnetic field is controlled depending on the detected temperature by the temperature sensor 20 to maintain a constant size of the effective reproducing region at all times.

9 Claims, 13 Drawing Sheets

FIG. 3A
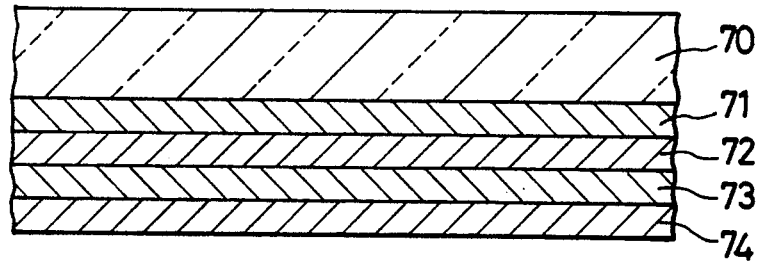
FIG. 3B
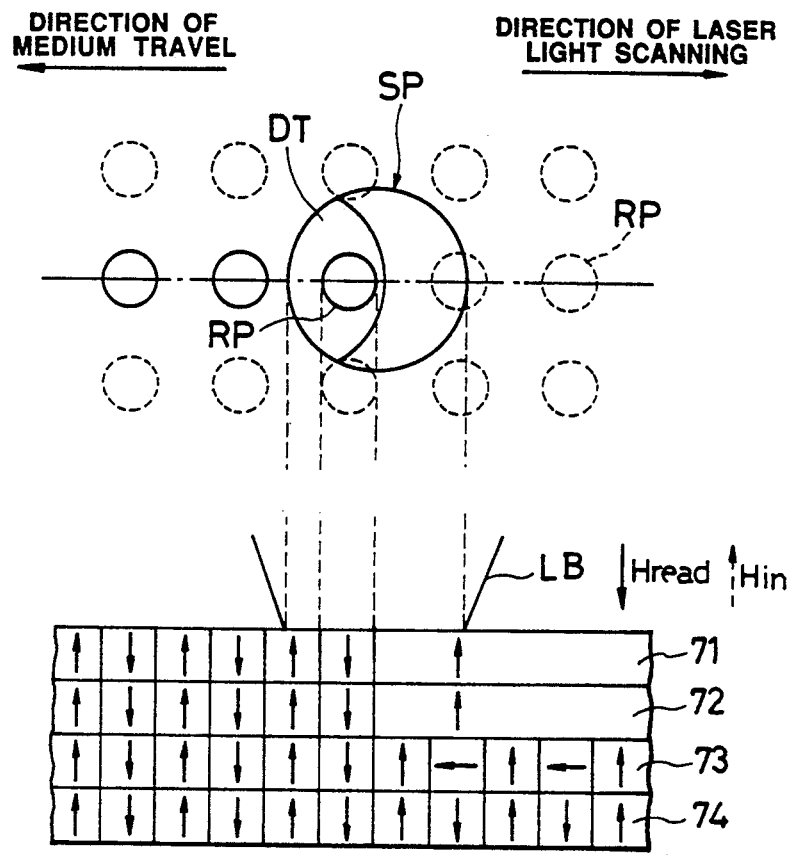
FIG. 3C

← TEMPERATURE
←--- LIGHT INTENSITY

TEMPERATURE DETECTION OF A MAGNETO-OPTIC RECORDING MEDIUM FOR CONTROLLING IRRADIATION OF AN ERASURE REGION

TECHNICAL FIELD

This invention relates to a method for reproducing signals from an optical recording medium in which signals are read while a light beam is radiated on the recording medium. More particularly, it relates to a method for reproducing signals from the recording medium capable of reproducing the information recorded with high recording density.

BACKGROUND ART

An optical recording medium may be roughly classified into a read-only medium, such as a so-called compact disc, and a medium on which signals can be recorded, such as a magneto-optical disc. With any of these optical recording media, it is desired to improve the recording density to a higher level. It is because a data volume several to more than ten times that of digital audio signals is required when recording digital video signals and because a demand is raised for reducing the size of the recording medium, such as a disc and hence the size of a product, such as a player, even when recording digital audio signals.

Meanwhile, the recording density of recording the information on the recording medium is governed by the S/N ratio of the playback signals. In the typical conventional optical recording and reproduction, the total area of a beam spot SP, which is a radiation region of the readout beam, such as the laser beam for the optical recording medium, as shown in FIG. 1, is a playback signal region. Thus the reproducible recording density is governed by the diameter $D_{SP}$ of the beam spot of the readout beam.

If, for example, the diameter $D_{SP}$ of the beam spot SP of the readout laser beam is lesser than a pitch q of a recording pit RP, two recording pits cannot be present in the spot SP, and the playback output waveform is as shown at B in FIG. 1, so that the playback signals can be read. However, if the recording pits SP are formed at a higher density, and the diameter $D_{SP}$ of the beam spot SP becomes larger than the pitch q of the recording pit RP, as shown at C in FIG. 1, two or more pits may be present simultaneously in the spot SP, so that the playback output waveform becomes substantially constant as shown at D in FIG. 1. In this case, these two recording pits cannot be reproduced separately, so that reproduction becomes infeasible.

The spot diameter $D_{SP}$ depends on the wavelength $\lambda$ of the laser beam and on the numerical aperture NA. It is this spot diameter $D_{SP}$ that governs the pit density along the scanning direction of the read-out beam or the recording track direction, or the so-called line density, and the track density conforming to the track interval between neighboring tracks in a direction at right angles to the scanning direction of the readout beam, or the so-called track pitch. The opto-physical limits of the line density and the track density are set by the wavelength $\lambda$ of the readout beam source and the numerical aperture NA of the objective lens and the read-out limit of $2NA/\lambda$ is generally accepted as long as the spatial frequency at the time of signal reproduction is concerned. For this reason, for achieving high density of the optical recording medium, it is necessary to diminish the wavelength $\lambda$ of the light source of the reproducing optical system, such as a semiconductor laser, as well as to enlarge the numerical aperture NA of the objective lens.

The present Applicant has already proposed an optical recording medium in which the recordable line recording density as well as the track density may be increased without changing the spot diameter of the readout beam spot, and a method for reproducing the optical recording medium. The optical recording medium capable of reproducing the high density information in this manner may be enumerated by a magneto-optical recording medium capable of recording information signals and a variable reflectance type optical recording medium at least capable of reproducing information signals.

The above-mentioned magneto-optical recording medium includes a magnetic layer, such as a rare earth-transition metal alloy thin film, deposited on a major surface of a transparent substrate or light-transmitting substrate of e.g. polycarbonate, together with a dielectric layer and a surface protecting layer. The magnetic layer has an easy axis of magnetization perpendicular to the film surface and exhibits superior magneto-optical effect. The laser beam is irradiated from the side of the transparent substrate for recording/reproducing information signals. Signals are recorded on the magneto-optical recording medium by so-called thermo-magnetic recording in which the magnetic layer is locally heated by e.g. laser beam radiation to close to the Curie temperature to reduce the coercivity to zero in this region and a recording magnetic field is applied to this region from outside for magnetization in the direction of the recording magnetic field. The recorded signals may be reproduced by taking advantage of the magneto-optical effect, such as the so-called magnetic Kerr effect or Faraday effect, in which the plane of polarization of the linearly polarized light, such as laser beam, is rotated in the direction of the magnetization of the magnetic layer.

The variable reflectance type optical recording medium is produced by depositing a material changed in reflectance with temperature on a transparent substrate on which phase pits are formed. During signal reproduction, the readout beam is radiated on the recording medium and the reflectance is partially changed within the scanning spot of the readout beam to read out the phase pits.

In connection with the above-mentioned magneto-optical recording medium, high density reproduction or so-called high resolution reproduction is hereinafter explained.

The present Applicant has previously proposed in e.g. Japanese Patent Laid-Open Publication No. 1-143041 (1989) and Japanese Patent Laid-Open Publication No. 1-143042 (1989) a method for reproducing information signals for a magneto-optical recording medium wherein information bits (magnetic domains) are enlarged, diminished or reduced to zero for improving the playback resolution. The essential point of the technology consists in that the recording magnetic recording layer is an exchange-coupled multilayer film composed of a reproducing layer, an intermediate layer and a recording layer, and in that the magnetic domain heated by the playback light beam during reproduction is enlarged, diminished or erased at a zone of higher temperatures for diminishing the inter-bit interference during reproduction to render it possible to reproduce signals of a period lower than the light diffraction threshold. There is also proposed in the application documents of JP Patent Application No. 1-229395 (1989) a technology in which the recording layer of the magneto-optical recording medium is formed by a multilayer film including a magnetically coupled reproducing layer and a recording holding layer, the direction of magnetization is aligned in advance to an erased state, the reproducing layer is heated to a temperature higher than a predetermined temperature by irradiation of the laser light and in which magnetic signals written on the recording holding layer only in this heated state are read out while being transcribed on the reproducing layer to eliminate signal crosstalk to improve the line recording density and the track density.

The above-described high density reproducing technology may be roughly classified into an erasure type and a relief type, shown schematically in FIGS. 2 and 3, respectively.

Referring first to FIGS. 2A, 2B and 2C, the erasure type high density reproduction technique is explained. With the erasure type, the recording medium, on which information recording pits RP are exhibited at room temperature, is heated by irradiation of a laser light LB to produce an erased region ER within the beam spot SP of the radiated laser beam LB, as shown at B in FIG. 2, and the recording pit RP within a remaining region RD within the beam spot SP is read, by way of achieving reproduction with improved line density. In sum, this technique consists in that, when reading the recorded pit RP within the beam spot SP, the erased region ER is used as a mask to narrow the width d of the read-out region (playback region) RD to provide for reproduction with an increased density along the scanning direction of the laser light (track direction), that is the so-called line recording density.

The recording medium for erasure type high density reproduction has an exchange-coupled magnetic multilayer film structure composed of an amorphous rare earth for photomagnetic recording (Gd, Tb)-iron group (Fe, Co) ferrimagnetic film. In an example shown at A in FIG. 2, the recording medium has a structure in which a reproducing layer as a first magnetic film 61, an interrupting layer (intermediate layer) as a second magnetic layer 62 and a recording holding layer as a third magnetic layer 63, deposited in this order on a major surface (the lower surface in the drawing) of a transparent substrate 60 formed of e.g. polycarbonate. The first magnetic layer (reproducing layer) 61 is e.g. a GdFeCo layer with a Curie temperature $T_{c1} > 400°$ C., while the second magnetic layer (interrupting layer or an intermediate layer) 62 is e.g. a TbFeCoAl film having a Curie temperature $T_{c2}$ of 120° C. and the third magnetic layer (recording holding layer) is e.g. a TbFeCo layer with a Curie temperature $T_{c3}$ of 300° C. Meanwhile, arrow marks in the magnetic films 61 to 63 shown at C in FIG. 2 represent the direction of magnetization of the magnetic domains. $H_{read}$ represents the direction of the reproducing magnetic domain.

The reproducing operation is briefly explained. At an ambient temperature below a predetermined temperature $T_{OP}$, the layers 63, 62 and 61 of the recording medium are magnetically coupled in the state of static magnetic coupling or exchange coupling, while the recording magnetic domain of the recording holding layer 63 is transcribed to the reproducing layer 61 by means of the interrupting layer 62. If the laser beam LB is radiated on the recording medium for raising the medium temperature, changes in the medium temperature are produced with a time delay with the scanning of the laser beam, so that a region at a temperature higher than the predetermined temperature $T_{OP}$, that is the erased region ER, is shifted slightly towards the rear side of the laser spot SP in the laser scanning direction. At the temperature higher than the predetermined temperature $T_{OP}$, the magnetic coupling between the recording holding layer 63 and the reproducing layer 61 disappears and the magnetic domains of the reproducing layer 61 are aligned in the direction of the reproducing magnetic field $H_{read}$, with the recording pits being erased on the medium surface. A region RD of the scanning spot SP, excluding a superposed region with the region ER where the temperature is higher than the predetermined temperature $T_{OP}$, substantially represents a reproducing region. That is, the laser spot SP of the laser beam is partially masked by the region ER where the temperature becomes higher than the predetermined temperature $T_{OP}$, so that the small unmasked region becomes the reproducing domain RD to achieve high density reproduction.

Since pits may be reproduced by detecting e.g. the Kerr rotation angle of the beam reflected from a small reproducing region (readout region RD) in which the scanning spot SP of the laser beam is not masked by the masking region (erased region ER), the beam spot SP is equivalently increased in diameter for increasing the line recording density and the track density.

In the relief type high density reproducing technique, shown at B in FIG. 3, the recording medium in a state in which information recording pits RP are erased at ambient temperature (initialized state) is irradiated with a laser beam and thereby heated to form a signal detecting region DT, as a recording relieved region, within the beam spot SP of the laser beam, and only the recording pit RP within this signal detecting region DT is read for improving the playback line density.

The recording medium for such high density relief reproduction has a magnetic multilayer structure according to magnetostatic coupling or magnetic exchange coupling. In an example shown at A in FIG. 3, a reproducing layer 71 as a first magnetic layer, a reproduction assistant layer 72 as a second magnetic layer, an intermediate layer 73 as a third magnetic layer 73 and a recording holding layer 74 as a fourth magnetic layer are stacked sequentially on a major surface (the lower surface in FIG. 3) of a transparent substrate 70 formed of e.g. polycarbonate. The first magnetic layer (reproducing layer) 71 is formed e.g. of GdFeCo and has a Curie temperature $T_{c1} > 300°$ C., the second magnetic layer (reproduction assistant layer) 72 is formed e.g. of TbFeCoAl and has a Curie temperature $T_{c2} \approx 120°$ C., the third magnetic layer (intermediate layer) 73 is formed e.g. of GdFeCo and has a Curie temperature $T_{c3} \approx 250°$ C. and the fourth magnetic layer (recording holding layer) 74 is formed e.g. of TbFeCo and has a Curie temperature $T_{c4} \approx 250°$. The magnitude of an initializing magnetic field $H_{in}$ is selected to be larger than a magnetic field $H_{cp}$ inverting the magnetization of the reproducing layer ($H_{in} > H_{cp}$) and sufficiently smaller than the magnetizing field $H_{cr}$ inverting the magnetization of the recording holding layer ($H_{in} < < H_{cp}$). The arrows in the magnetic layers 71, 72 and 73 at C in FIG. 3 indicate the direction of magnetization in each domain, $H_{in}$ indicates the direction of the initializing magnetic field and $H_{read}$ the direction of the reproducing magnetic field.

The recording holding layer 74 is a layer holding recording pits without being affected by the initializing magnetic field $H_{in}$, the reproducing magnetic field $H_{read}$ or the reproducing temperature, and exhibits sufficient coercivity at room temperature and at the playback temperature.

The intermediate layer 73 exhibits perpendicular anisotropy less than that of the reproduction assistant layer 72 or the recording holding layer 74. Therefore, a magnetic wall may exist stably at the intermediate layer 73 when the magnetic wall is built between the reproducing layer 71 and the recording layer 74. For this reason, the reproducing layer 71 and the reproduction assistant layer 72 maintain the erased state (initialized state) in stability.

The reproduction assistant layer 72 plays the role of increasing coercivity of the reproducing layer 71 at room temperature, so that magnetization of the reproducing layer 71 and the reproduction assistant layer 72 may exist stably despite presence of the magnetic wall. On the other hand, coercivity is decreased acutely during reproduction in the vicinity of the reproduction temperature $T_s$ so that the magnetic wall confined in the intermediate wall 73 is expanded to the reproduction assistant layer 72 to invert the reproducing layer 71 ultimately to extinguish the magnetic wall. By this process, pits are caused to appear in the reproducing layer 71.

The reproducing layer 71 has a low inverting magnetic field $H_{cp}$ so that the domains of overall surface of the layer 71 may be aligned by the initializing field $H_{in}$. The aligned domains are supported by the reproduction assistant layer 72 and may thereby be maintained stably even if there exist a magnetic field between the layer and the reproduction assistant layer 74. Recording pits are produced by the disappearance of the magnetic wall between the layer and the recording holding layer 74 during reproduction, as described above.

The operation during reproduction is explained briefly. The domains of the reproducing layer 71 and the reproduction assistant layer 72 are aligned before reproduction in one direction (in an upward direction in FIG. 3) by the initializing magnetic field $H_{in}$. At this time, a magnetic wall (indicated in FIG. 3 by a transversely directed arrow) is present stably so that the reproducing layer 71 and the reproduction assistant layer 72 are stably maintained in the initialized state.

A reproducing magnetic field $H_{read}$ is applied in an inverse direction while a laser beam LB is radiated. The reproducing magnetic field $H_{read}$ needs to be in excess of the magnetic field which inverts the domains of the reproducing layer 71 and the reproduction assistant layer 72 at a reproduction temperature $T_{RP}$ following temperature increase by laser irradiation to cause extinction of the magnetic field of the intermediate layer 73. The reproducing magnetic field also needs to be of a such a magnitude as not to invert the direction of magnetization of the reproducing layer 71 and the reproduction assistant layer 72.

With scanning by the laser beam, temperature changes in the medium are produced with a delay, so that the region whose temperature exceeds a predetermined reproducing temperature $T_{RP}$ (recording relieved region) is shifted slightly from the beam spot SP towards the rear side along the scanning direction. With the temperature above the predetermined reproducing temperature $T_{RP}$, coercivity of the reproduction assistant layer 72 is lowered, so that, when the reproducing magnetic field $H_{read}$ is applied, the magnetic wall is caused to disappear so that the information of the recording holding layer 74 is transcribed on the reproducing layer 71. Thus a region within the beam spot SP which does not reach the reproducing temperature $T_{RP}$ is masked and the remaining region within the beam spot SP becomes the signal detecting region (reproducing region) DT which is the recording relieved region. High density reproduction may be achieved by detecting e.g. the Kerr rotation angle of a plane of polarization of the reflected beam from the signal detecting region DT.

That is, the region within the beam spot SP of the laser beam LB which does yet not reach the reproduction temperature $T_{RP}$ is a mask region in which recording pits are not displayed, while the remaining signal detecting region (reproducing region) DT is smaller in area than the spot diameter, so that the line recording density and the track density may be increased in the same manner as described above.

There is also devised a high density reproducing technique consisting in a combination of the erasure type and the relief type. With this technique, the laser beam is radiated to the recording medium in an initialized state thereof in which recording pits are extinct at room temperature. This heats the recording medium for forming a recording relieved region at a site slightly deviated towards the rear side of the beam spot of the radiating laser beam, simultaneously forming an erased region of a higher temperature within the recording relieved region.

In the specification and the drawings of our co-pending JP Patent Application No. H 3-418110 (1991), there is proposed a signal reproducing method for a magneto-optical recording medium wherein a magneto-optical recording medium having at least a reproducing layer, an intermediate layer and a recording holding layer is employed, a laser beam is radiated and a reproducing magnetic field is applied to the reproducing layer, a temperature distribution generated by the laser radiation is utilized to produce a region where an initialized state is maintained, a region to which the information of the recording holding layer is transcribed and a region the domains of which are aligned in the direction of the reproducing magnetic field, in a field of view of the lens, to produce a state equivalent to optically masking the field of view of the lens to increase the line recording density and the track density as well as to assure satisfactory frequency characteristics at the time of reproduction, there being no risk that, even if the reproducing power is fluctuated, the region of transcription of the information of the recording holding layer be diminished or enlarged.

According to the above-described high density reproducing technique employing such magneto-optical recording medium, only the read region RD, which is in effect the signal reproducing region, or the recording pit RP within the signal detecting region DT, is read within the beam spot SP. Since the size of the read region RD or the signal detection region DT is smaller than the size of the beam spot SP, the distance between adjacent pits in the directions along and at right angles to the laser beam scanning direction may be reduced to raise the line density and the track density to increase the recording capacity of the recording medium.

Meanwhile, with the above-described method for reproducing the high-density information, even although the external reproducing magnetic field is constant and the laser light power is constant, the size of the region RD of FIG. 2 or that of the region DT of FIG. 3, as the reproducing region, is fluctuated with changes in the temperature of the recording medium, such as the magneto-optical disc, brought about by changes in ambient temperature.

For example, with the erasure type reproducing method, explained in connection with FIG. 2, if the temperature of the recording medium, such as the magneto-optical disc, is high, the state of temperature distribution shows a shift towards a higher temperature, as shown by a curve a at B in FIG. 4, so that the erased region exceeding the Curie temperature $T_c$ (mask region) is as shown at $ER_{HT}$ at A in FIG. 4, so that the effective reading region (reproducing region) RD is diminished.

On the other hand, if the temperature of the recording medium is low, the state of temperature distribution shows a shift towards a lower temperature, as shown by a curve b at B in FIG. 4, so that the erased region exceeding the Curie temperature $T_c$ (mask region) is as shown at $ER_{LT}$ at A in FIG. 4, so that the effective reading region (reproducing region) RD is diminished.

With the relief type, as will become apparent from its operating principle, if the temperature of the magneto-optical recording medium is high, the reproducing region is increased, whereas, if the temperature of the magneto-optical recording medium is low, the reproducing region is diminished.

As described above, if, with the erasure type reproducing method or with the relief type reproducing method, the effective reproducing region is fluctuated, there is a risk that stable reproduction with a high S/N ratio cannot be achieved.

The same may be said when reproducing a variable reflectance optical recording medium by way of high density reproduction or ultra high resolution reproduction. That is, since the portion within the readout beam which is changed in reflectance is changed in size with changes in the medium temperature, the high reflectance portion, which is in effect the reproducing region, is fluctuated in size with the medium temperature, so that stable reproduction can occasionally not be achieved.

In view of the above-described status of the art, it is an object of the present invention to provide a method for reproducing an optical recording medium in which, even although the temperature of the magneto-optical recording medium of the variable reflectance type optical recording medium is changed, the size of the effective reproducing region may be maintained constant to assure stable reading of information signals.

DISCLOSURE OF THE INVENTION

According to the present invention, there is provided a method for reproducing an optical recording medium comprising a recording layer and a reproducing layer, the recording and reproducing layers being magnetically coupled to each other in steady state, the method comprising extinguishing magnetic coupling between the recording layer and the reproducing layer in a region the temperature of which is raised to a temperature higher than a predetermined temperature by irradiation of a readout laser beam during reproduction, and reading the recording information held by said recording layer in an area of an irradiated region other than the magnetic coupling extinguished region, characterized by detecting the temperature of said optical recording medium and controlling the size of the magnetic coupling extinguished region based on the detected temperature.

It is preferred to control the intensity of the readout beam based on the detected temperature of the recording medium. It is also preferred to control the size of the first region based on the level of the signal read out from the reproducing layer.

According to the present invention, there ia also provided a method for reproducing an optical recording medium comprising a recording layer and a reproducing layer, the method comprising aligning the domains of said reproducing layer, transcribing the recording information held by the recording layer in a region of the recording medium in which the temperature is raised to a temperature higher than a predetermined temperature by irradiation of a readout beam during reproduction for relieving the transcribed recording information, and reading out the recording information from a relieved region of said reproducing layer, characterized by detecting the temperature of the optical recording medium, and controlling the size of the relieved region based on the detected temperature.

It is preferred to impress a reproducing magnetic field when transcribing and relieving the recording information held by the recording layer during reproduction to the reproducing layer, and to control the intensity of the reproducing magnetic field based on the detected temperature of the recording medium. It is also preferred to control the size of the relieved region based on the level of a signal read from said reproducing layer.

According to the present invention, there is additionally provided a method for reproducing an optical recording medium having phase pits formed thereon in accordance with signals and having its reflectance changed with temperature, the method comprising radiating a readout beam to the recording medium and reading out the phase pits while partially changing the reflectance within a scanning spot of a readout beam, characterized by detecting the temperature of the optical recording medium and controlling the size of a portion within the scanning spot of the readout light beam in which reflectance is changed depending on the detected temperature.

It is preferred to control the intensity of the readout light beam based on the detected temperature of the recording medium and to control the size of said portion in which reflectance is changed depending on the level of the signal read out from the optical recording medium.

In this manner, according to the present invention, the size of the region where the magnetic coupling has been extinguished, the relieved region or the portion where the reflectance is changed may be controlled even although the temperature of the optical recording medium is changed, so that the size of the effective reproducing region may be rendered constant to achieve reproduction with high S/N ratio as well as to realize high density reproduction or reproduction with ultra-high resolution.

BRIEF DESCRIPTION OF THE DRAWINGS

FIGS. 3A-3C are a view for illustrating a relief type magneto-optical recording medium, a method for reproducing the recording medium and an effective reproducing region of the recording medium.

BEST MODE OF CARRYING OUT THE INVENTION

Figure 1A:
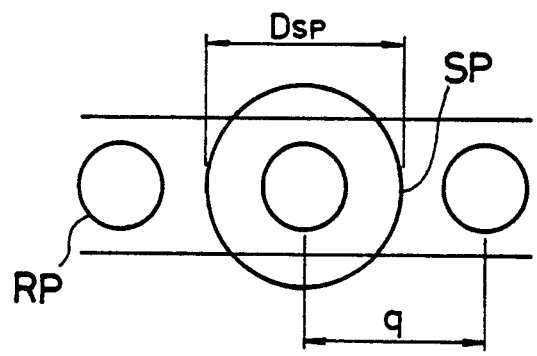
FIGS. 1A-1D are a view for illustrating the relation between the spot diameter of a laser beam and the recording density of reproducible recording pits.
Figure 1B:
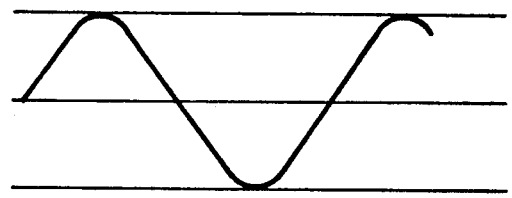
Figure 1C:
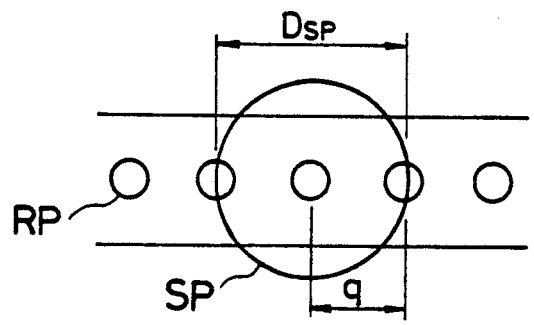
Figure 1D:
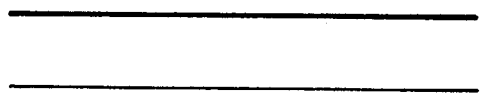
Figure 2A:
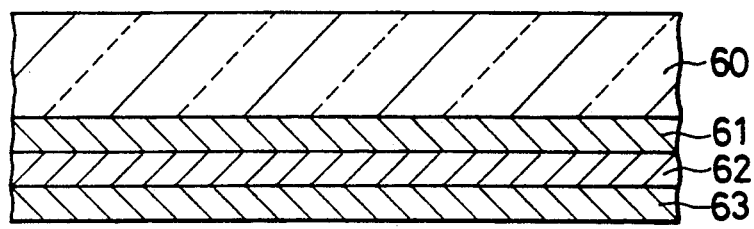
FIGS. 2A-2C are a view for illustrating an erasure type magneto-optical recording medium, a method for reproducing the recording medium and an effective reproducing region of the recording medium.
Figure 2B:
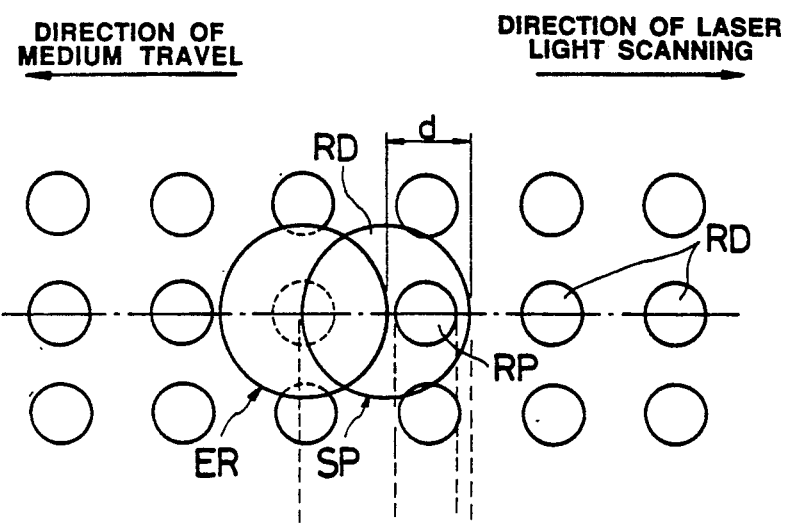
Figure 2C:
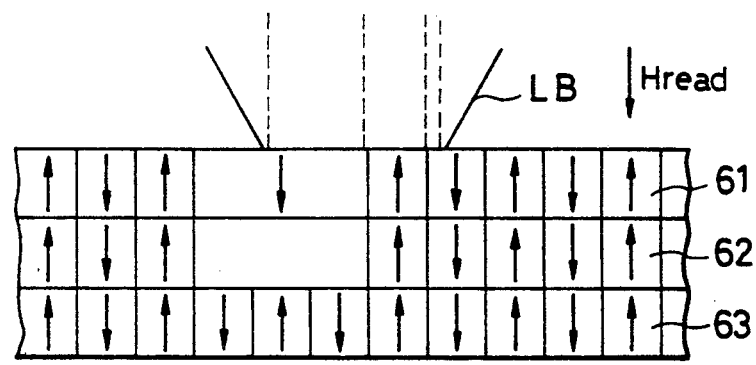
Figure 4A:
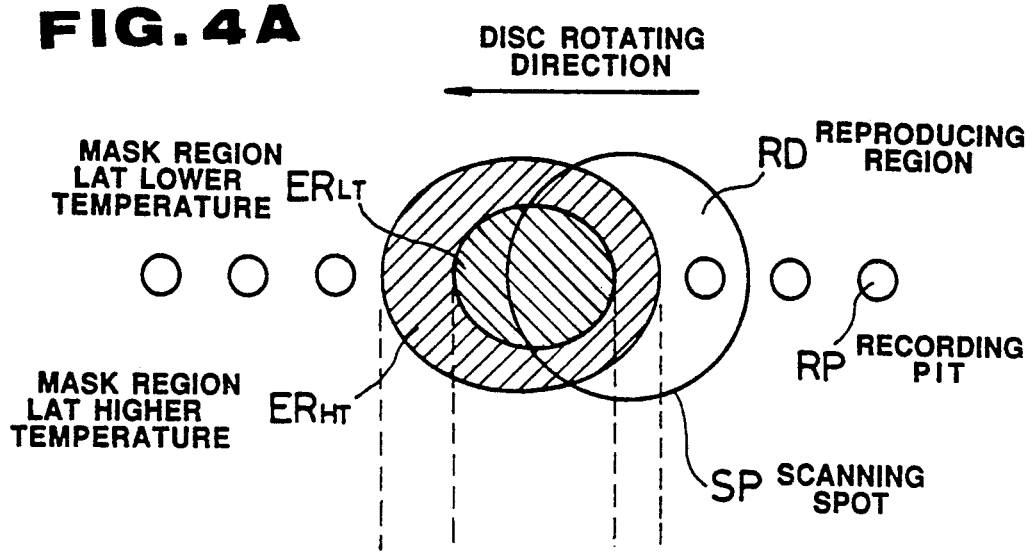
FIGS. 4A and 4B are a view for illustrating that the effective reproducing region is changed with changes in the temperature of the magneto-optical recording medium.
Figure 4B:
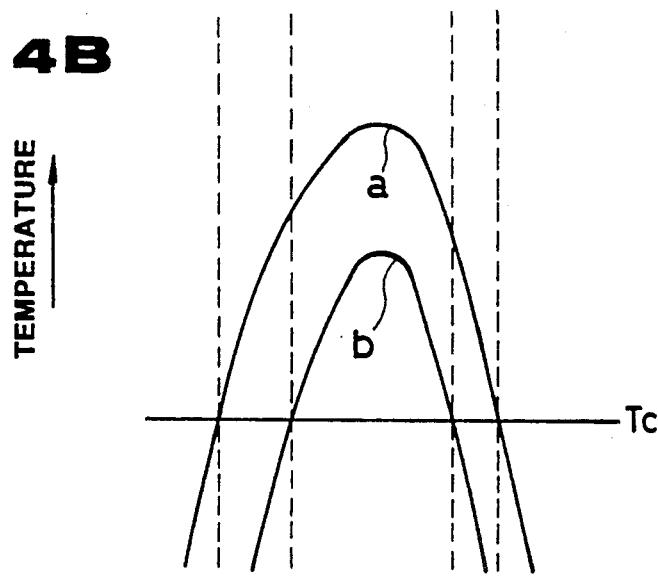

Referring to the drawings, certain embodiments of an optical recording medium according to the present invention will be explained. First, an embodiment in which the present invention is applied to a magneto-optical recording medium as a recordable medium, and then an embodiment in which the present invention is applied to a variable reflectance optical recording medium as a recordable medium will be explained.

Figure 5:
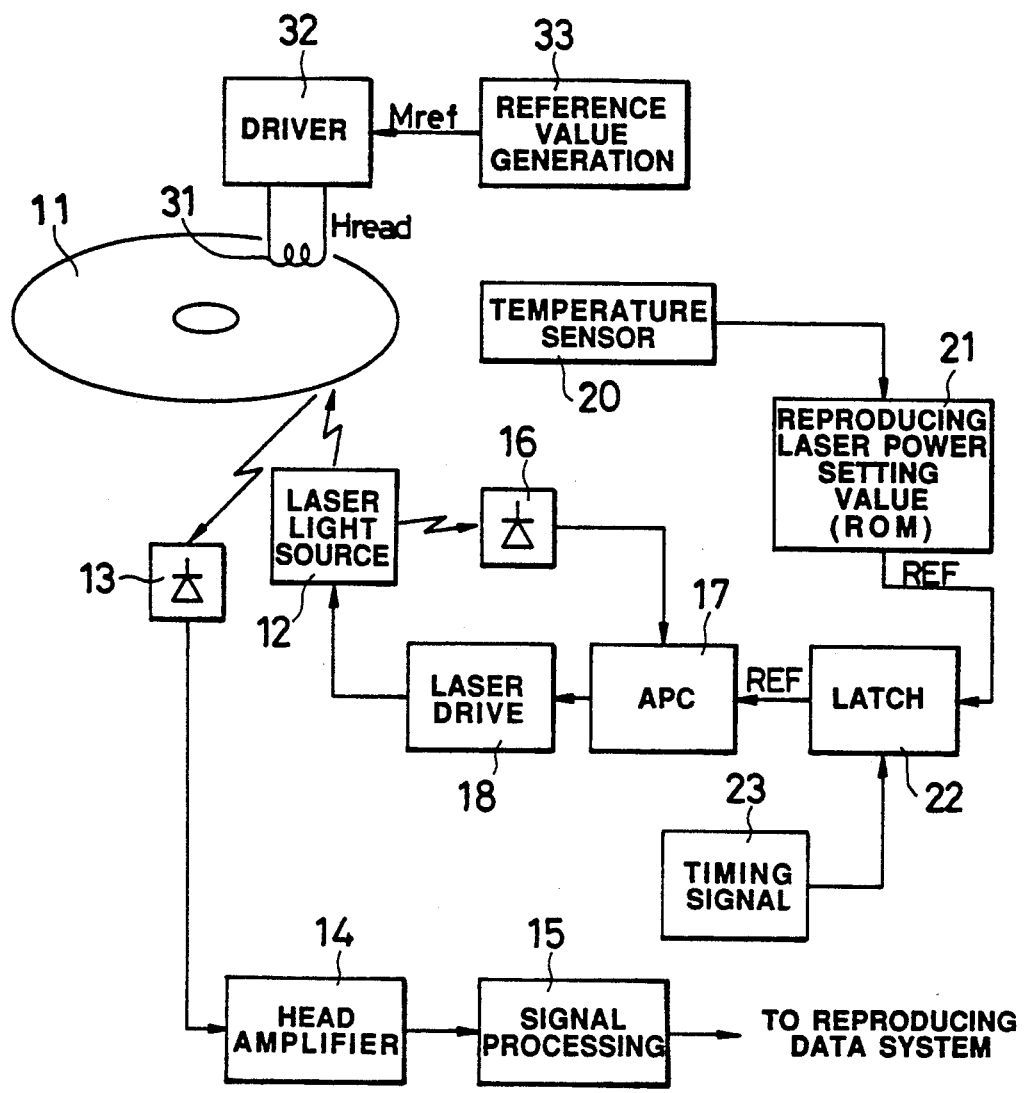
FIG. 5 is a block diagram showing essential parts of a disc reproducing apparatus to which an embodiment of the reproducing method for the magneto-optical recording medium according to the present invention is applied.

In FIG. 5, a magneto-optical recording medium is a magneto-optical disc 11, to which the above-mentioned erasure type or relieved type reproducing method is applied. The rotating driving system for the magneto-optical disc 11 may be of a constant angular velocity (CAV) type or of a constant linear velocity type (CLV) type.

For example, the magneto-optical disc to which the erasure type reproducing method is applied has an exchange-coupled magnetic multilayer film structure composed of an amorphous rare earth (Gd, Tb)-iron group (Fe, Co) ferrimagnetic film for magneto-optical recording which is made up of a recording holding layer formed e.g. of TbFeCo with a Curie temperature of 300° C., an interrupting layer (intermediate layer) of e.g. TbFeCoAl with a Cure temperature T of 120° C. and a reproducing layer of e.g. GdFeCo with a Curie temperature of not lower than 400° C. The magneto-optical disc to which the relief type reproducing method is applied is such a disc in which the recording holding layer is formed of e.g. TbFeCo with a Curie temperature of 250° C., the intermediate layer is formed e.g. of GdFeCo with a Curie temperature of 250° C., the reproduction assistant layer is formed e.g. of TbFeCoAl with a Curie temperature of 120° C. and the reproducing layer is formed e.g. of GdFeCo with a Curie temperature of not lower than 300° C.

As a readout beam, a laser light beam from a laser source, such as a semiconductor laser, is incident on the reproducing layer of the magneto-optical disc 11.

In the present embodiment, a reproducing magnetic field $H_{read}$ is generated by the driving current supplied to a magnetic field generating coil 31 from a driver 32. The magnetic field generating coil 31 is arranged facing the laser source 11 on the opposite side of the magneto-optical disc 11 with respect to the laser beam side. A reference value $M_{ref}$ from a reference value generating circuit 23 is supplied to the driver 22 and the magnitude of the reproducing magnetic field $H_{read}$ generated by the coil 21 is set so as to be a constant value conforming to this reference value.

In accordance with he above-mentioned erasure or relief type reproducing method, the reflected light from the reproducing region RD or DT within the beam spot of the laser beam is incident on the reproducing photodetector 13 by optical means, not shown, for photoelectric conversion.

Output signals of the photodetector 13 are supplied via a head amplifier 14 to a signal processing circuit 15 to produce RF signals which are supplied to a data reproducing system for demodulation.

Part of the laser beam from the laser source 12 is incident on a laser power monitoring photodetector 16. The photoelectrically converted output of the photodetector 16 is supplied to an automatic power controller 17, in which the output of the photodetector 16 and a reproducing laser power setting reference value REF from a latch circuit 22 are compared to each other. Outputs of the comparison error are supplied to a laser driving circuit 18 so that the output power from the laser source 12 is controlled so as to conform to the reproducing laser power setting reference value REF.

In the present embodiment, the reproducing laser power setting reference value REF is adapted to conform to the temperature of the magneto-optical disc 11, as will now be explained.

That is, a temperature sensor 20, such as a thermistor, is provided in the vicinity of the magneto-optical disc 11 for sensing the temperature of the magneto-optical disc 11. A temperature output sensed by the temperature sensor 20 is supplied to a ROM 21, which stores a table of the reproducing laser power setting reference value REF, as a readout address therefor. Different reproducing power setting reference values REF are read out from ROM 21 depending on temperature outputs from temperature sensor 20. The read-out setting reference value REF is latched by latch circuit 22 by timing signals from a timing signal generator 23 before being supplied to automatic power controller 16. As a result, the output power of laser light source 12 is controlled so as to conform to the setting reference value conforming in turn to the prevailing temperature of the magneto-optical disc 11.

Figure 6:
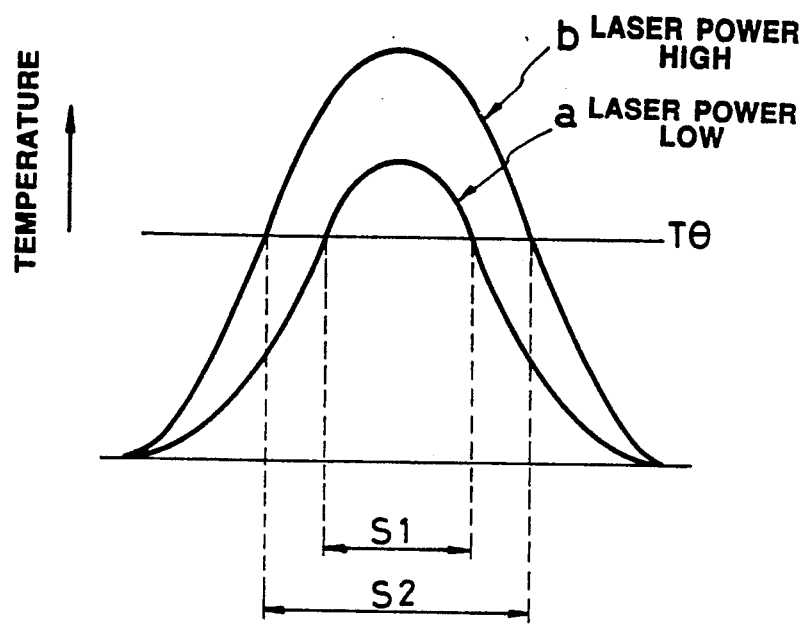
FIG. 6 is a view for illustrating that a mask region is changed by changing a laser power.

As explained previously, if the temperature of the magneto-optical disc 11 is changed, the temperature distribution by the laser beam scanning spot is shifted with the disc temperature. However, if the laser output power is changed, the size of a region in excess of a predetermined threshold temperature T8 is changed, as shown at S1 and S2 in FIG. 6, even although the temperature of the magneto-optical disc 11 is constant. Thus, by controlling the laser power as described above, the size of the reproducing regions RD and DT may remain constant even although the temperature of the magneto-optical disc 11 is changed.

ROM 21 stores a table for laser power setting reference value REF corresponding in a one-for-one relationship to minute temperature ranges obtained by subdividing the temperature range of the magneto-optical disc 11 in accordance with the storage capacity of ROM 21. The reproducing laser power setting reference values REF which will give an optimum constant sizes of the effective reproducing region RD or DT for reproduction for these temperature ranges of the magneto-optical disc 11 of the erasure or relief type are previously detected, and the reproducing laser power setting reference values REF associated with these temperature ranges are stored in ROM 21.

Whether or not the size of the reproducing region RD or DT is of an optimum constant value may be detected depending on whether or not the RF signal level from the signal processing circuit 15 is of a predetermined value when the predetermined reference pattern information is reproduced.

Therefore, while the reproducing laser power setting reference value REF conforming to the temperature of the magneto-optical disc 11 detected by temperature sensor 20 is perpetually read out from ROM 21, the reproducing laser power setting value REF need not be changed continually, but needs only to be changed at a time point which sufficiently takes account of temperature changes of the magneto-optical disc 11. In the present embodiment, an output of ROM 21 is latched by latch circuit 22 by timing signals from timing signal generator 23, and the reproducing laser power setting reference value REF is changed at the time points of the timing signals. These time points are the start time point and each predetermined time interval in which temperature changes are though to e produced, for example, each ten minutes, for example, and timing signal generator 23 generates timing signals at the reproducing start time point and each ten n minutes since the reproducing start time point.

Since the reproducing region RD or DT in the erasure type or relief type reproducing method may be maintained constant by controlling the laser power, even although the temperature of the magneto-optical disc 11 is changed with changes in ambient temperature, stable reproduction may be achieved at all times.

Meanwhile, an IR sensor for sensing the surface temperature of the magneto-optical disc 11 itself may be used as temperature sensor 20 in place of the sensor for sensing the temperature of the magneto-optical disc 11 by detecting the ambient temperature of the magneto-optical disc, such as thermistor, for a more accurate controlling operation.

A circuit for finding the reproducing laser power setting reference value REF from the information of the detected temperature from the temperature sensor may also be used as generator of the reproducing laser power setting reference value REF in place of ROM 21.

Although the laser power is controlled in the above embodiment for rendering the size of the reproducing regions RD and DT constant despite changes in the temperature of the magneto-optical disc, similar effects may also be achieved by controlling the external magnetic field (reproducing magnetic field $H_{read}$).

That is, with the erasure type reproducing method, for example, the temperature at which the mask region (erased region) ER starts to be generated is precisely not the Curie temperature $T_{c2}$ of the intermediate layer 62, but is correlated with the reproducing magnetic field $H_{read}$, and is a temperature such that $$H_{c1} + H_w < H_{read} \qquad (1)$$

wherein $H_{ci}$ is coercivity of the reproducing layer 61 and $H_w$ is the exchange-coupling force between layers 61 and 63. The exchange-coupling force $H_w$ between the reproducing layer 61 and the recording layer 63 becomes lower with rise in temperature and becomes equal to zero at the Curie temperature $T_{c2}$ of the intermediate layer 62.

Figure 7:
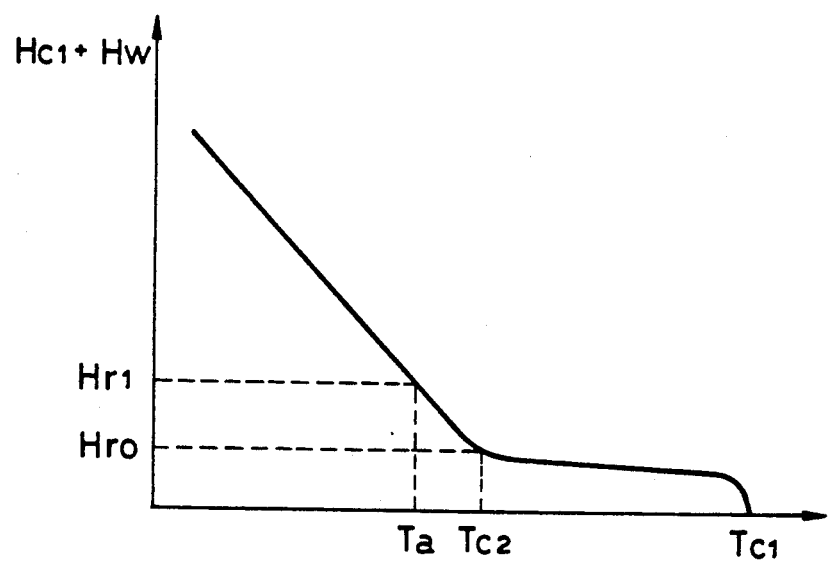
FIG. 7 is a view for illustrating that a mask region is changed by changing an external magnetic field.

FIG. 7 shows temperature characteristics of $H_{c1} + H_w$. In FIG. 7, $T_{c1}$ is the Curie temperature of the reproducing layer 61. At a temperature higher than the Curie temperature $T_{c2}$ of the intermediate layer, coercivity is similar to that when only one reproducing layer is provided.

For aligning the domains of the reproducing layer 61 of the magneto-optical disc, it suffices to apply a magnetic field larger than $H_{c1} + H_w$, as shown by the formula (1). Therefore, if $H_{r0}$ is applied as reproducing magnetic field $H_{read}$ in FIG. 7 for the same temperature distribution, the range having the temperature higher than the Curie temperature $T_{c2}$ becomes the mask region ER. However, if the strength of the reproducing magnetic field $H_{read}$ is $H_{r1}$, the range up to a temperature $T_a$ lower than the Curie temperature $T_{c2}$ becomes the mask region ER. In this manner, the size of the mask region is changed with the strength of the reproducing magnetic field $H_{read}$, so that the reproducing region RD is changed in size.

Therefore, by changing the external magnetic field, such as the reproducing magnetic field $H_{read}$, depending on the temperature of the magneto-optical disc 11, the reproducing region may perpetually be rendered constant.

The reproducing magnetic field may similarly by controlled in the case of the relief type reproducing method for rendering the size of the reproducing region DT constant.

Figure 8:
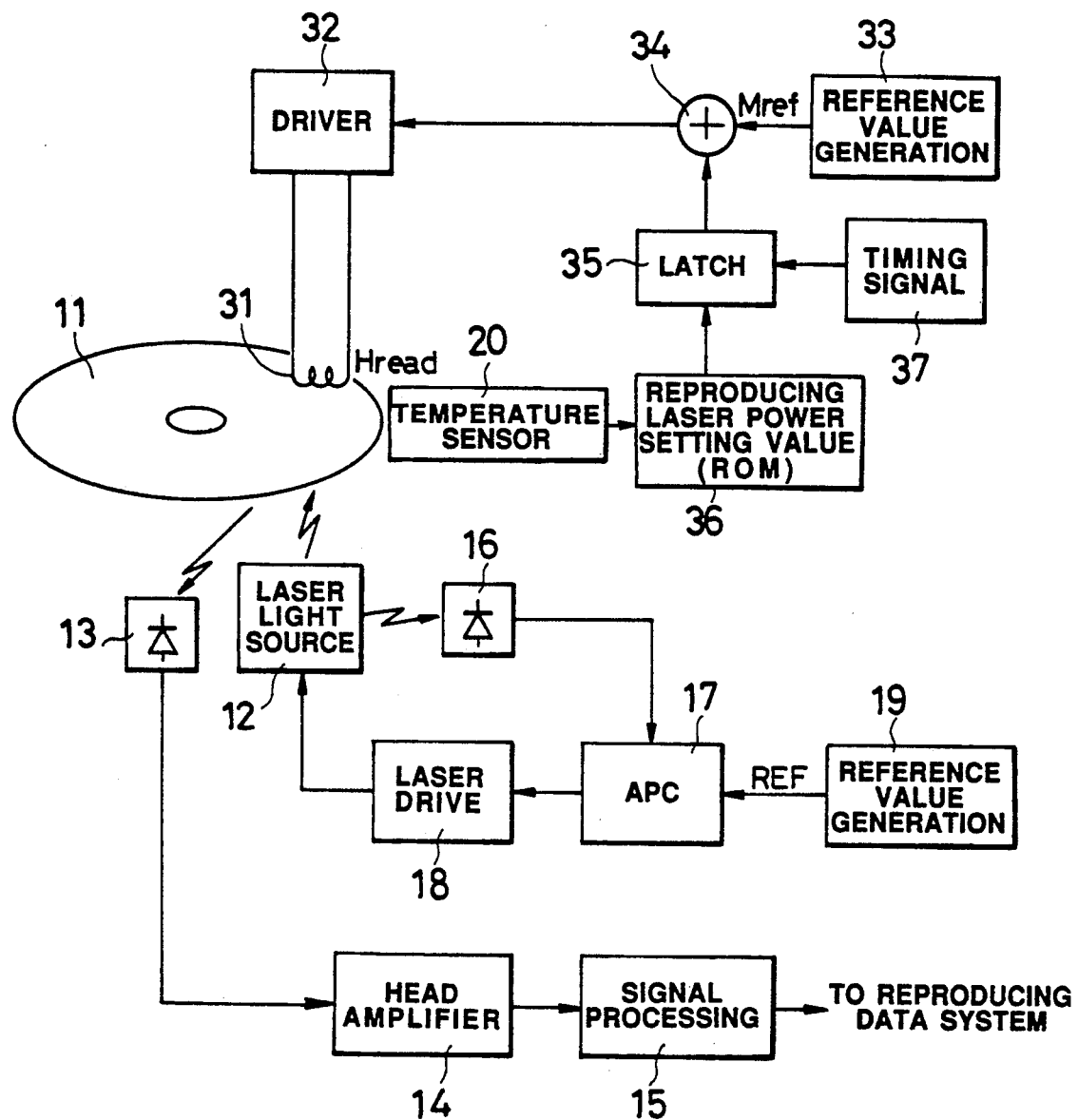
FIG. 8 is a block diagram showing essential parts of a disc reproducing apparatus to which another embodiment of the reproducing method for the magneto-optical recording medium according to the present invention is applied.

FIG. 8 shows an embodiment of essential parts of a reproducing apparatus in which the reproducing magnetic field is controlled depending on the temperature of the magneto-optical disc.

In the present embodiment, a constant laser power setting reference value REF from a reference value generator 19 is supplied to an automatic power controlling circuit 17 and an output laser power of the laser light source 12 is controlled to constant value conforming to this reference value.

A reference value $M_{ref}$ from a reference value generator 33 is supplied to an adder 34 where it is added to a correction value from a latch circuit 35. A driving signal consisting in the sum value is supplied to a driver 32. Thus the strength of the reproducing magnetic field $H_{read}$ is of a predetermined value conforming to the reference value REF, if the correcting value is zero, so that the strength is changed around the predetermined value depending on the correcting value.

In the present embodiment, a ROM 36 is provided for storing a table of the correcting values associated with the temperature of the magneto-optical disc 11, and a detected temperature output from the temperature sensor 20 is entered as a readout address for ROM 36. In the present embodiment, the correcting values stored in ROM 36 are of such values that the sizes of the reproducing regions RD and DT become perpetually constant for the respective temperatures of the magneto-optical disc 11.

Whether or not the size of the reproducing region RD and Dt is constant may again be detected depending on whether or not the RF signal level from signal processor 15 is of a constant value when the information of a predetermined reference pattern is reproduced.

The correcting values read from ROM 36 are latched by latch circuit 35 by timing signals from timing signal generator 37. The correcting values latched by latch circuit 35 are supplied to an addition circuit 34 for controlling he strength of the reproducing magnetic field depending on the temperature of the magneto-optical disc 11 for perpetually rendering the size of the reproducing region RD or DT.

Meanwhile, a circuit for calculating the correcting values from the information concerning the detection temperature from the temperature sensor may be used as the correcting value generator in place of ROM 36.

The laser power and the external magnetic field my also be controlled simultaneously, in place of independently controlling the laser power and the external magnetic field depending on the temperature of the magneto-optical disc, as in the above embodiment.

The present invention may also be applied to a magneto-optical disc of the type consisting in a mixture of the erasure and relief types.

With the high density reproducing technology employing these magneto-optical recording media, recording pits may be read only from reproducing regions narrower than the beam spot area. Besides, the effective size of the reproducing region may perpetually be rendered constant despite changes in the temperature of the recording media to provide for stable reproduction. The result is that high density may be achieved to increase the capacity of the recording medium to produce high quality reproducing signals at all times.

The above embodiments are directed to a recordable magneto-optical recording medium. The following description is made of an embodiment in which the present invention is applied to a variable reflectance magneto-optical recording medium.

As the technique concerning the variable reflectance optical recording medium, the present Applicant has already proposed a signal recording method for an optical disc in the specification and drawings of Japanese Patent Application NO. H-2-94452 (1990), and an optical disc in the specification and drawings of Japanese Patent Application No. H-2-291773 (1990). In the former, a signal reproducing method for an optical disc is disclosed, whereby a readout beam is radiated to an optical disc on which phase pits are formed depending on signals and which has the reflectance changed with temperatures, and the phase pits are read while the reflectance is partially changed within a scanning beam spot of the readout beam. In the latter, an optical disc of a so-called phase change type is disclosed, in which a layer of a material changed in reflectance with phase changes is formed on a transparent substrate which has reflectance changed with phase changes and in which, when the disc is irradiated with the readout beam, the layer partially undergoes phase changes within the scanning spot of the readout beam and is reset after readout is terminated.

The material of the layer is preferably such a material in which a layer of a phase change material which may be crystallized after being melted and in which, when the layer is irradiated with the readout beam, the material is changed into a liquid phase within the scanning spot of the readout beam within the melted and crystallized region as to be changed in reflectance and be reset to a crystallized state after readout is terminated.

Figure 9:
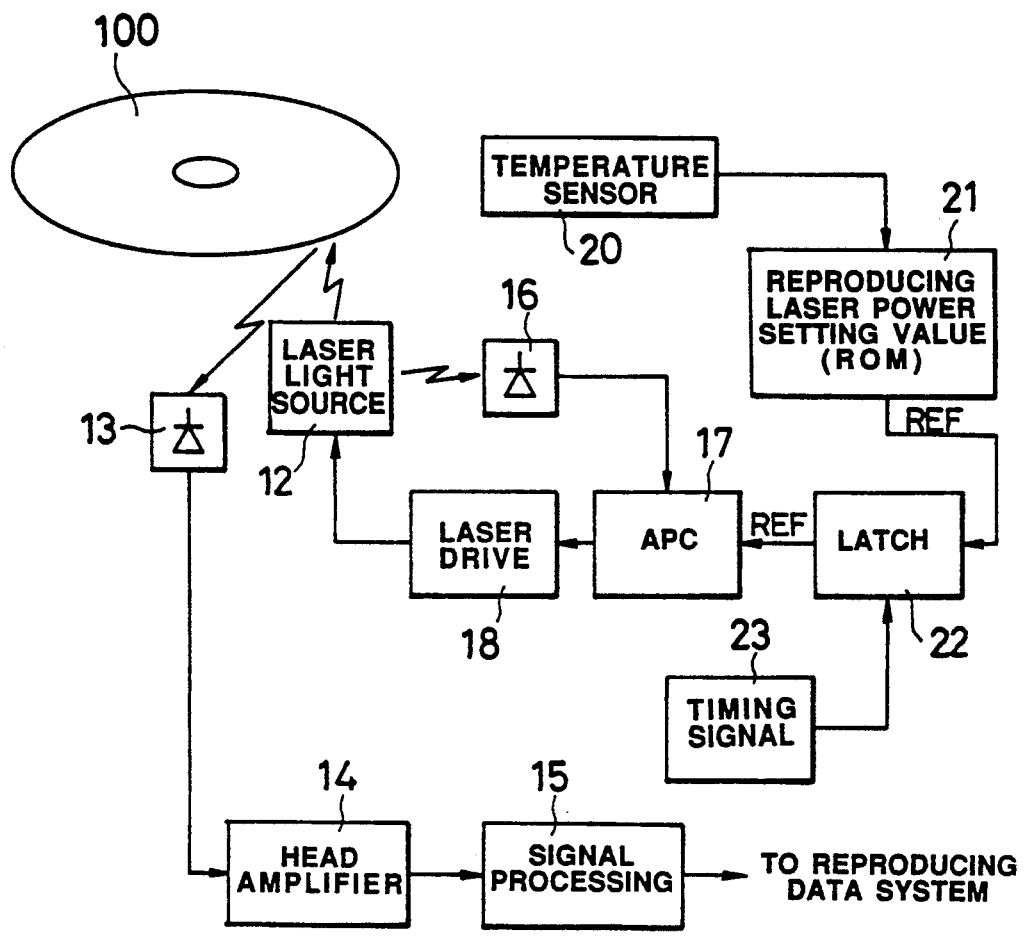
FIG. 9 is a block diagram showing essential parts of a disc reproducing apparatus to which a still another embodiment of the reproducing method for the magneto-optical recording medium according to the present invention is applied.

FIG. 9 shows essential parts of a disc reproducing apparatus to which is applied a modified embodiment of the reproducing method of the present invention employing the variable reflectance type optical recording medium, above all, the phase change type optical disc.

In FIG. 9, an optical disc 100 is a variable reflectance type optical disc, above all, a phase change type optical disc. The disc in which the reflectance of a portion thereof irradiated with the readout laser beam and raised in temperature is lower than that of the remaining portion corresponds to the erasure type magneto-optical disc, while the in which the reflectance of a portion thereof raised in temperature is lower than that of the remaining portion corresponds to the erasure type magneto-optical disc. The present embodiment is applicable not only to both types of the phase change type optical discs, but also to variable reflectance type optical discs based on other operating principles.

The arrangement shown in FIG. 9 is the same as that shown in FIG. 5 except that the magnetic field generating coil 21, driver 22 and the reference value generator 33 are eliminated and a variable reflectance type optical disc 100 is used in place of the magneto-optical disc 11.

That is, a light beam from the laser light source 12 is incident on the optical disc 100 and the beam reflected from a reproducing region within a laser beam spot is incident on a reproducing photodetector 13 to undergo photoelectric conversion while output signals from photodetector 13 are supplied by means of head amplifier 14 to a signal processor 15 to produce RF signals which are supplied to a data reproducing system for demodulation.

Part of the laser from the laser light source 12 is incident on a photodetector 16 for laser power monitoring to undergo photoelectric conversion before being supplied to an automatic controller 17. In the automatic controller 17, an output of the photodetector 16 and the reproducing laser power setting reference value REF from latch circuit 22 are compared to each other. A comparison error output from controller 17 is supplied to a laser driving circuit 18 for controlling the output power of the laser light source 12 to a value conforming to the reproducing laser power setting reference value REF.

In the present embodiment, the reproducing laser power setting reference value REF is adapted for conforming to the temperature of the optical disc 100.

A temperature sensor 20, such as a thermistor, is provided in the vicinity of the magneto-optical disc 100 for sensing the temperature of the magneto-optical disc 100. A temperature output, as sensed by temperature sensor 20, is supplied as a readout address to ROM 21 which stores a table of reproducing laser power setting reference values REF. The reproducing laser power setting reference values, which differ with temperature outputs from temperature sensor 20, are read from ROM 21. The read-out setting reference values REF are latched by latch circuit 22 by timing signals from timing signal generator 23 before being supplied to automatic power controlling circuit 16, as a result of which the output power of the laser light source 12 is controlled so as to conform to the setting reference value REF conforming in turn to the prevailing temperature of the optical disc 100.

With the variable reflectance optical disc 100, such as a phase change type disc, similarly to the above-mentioned magneto-optical disc, temperature distribution by the laser beam scanning spot is shifted with changes in the disc temperature, however, if the laser power output is changed, the size of the region having the reflectance changed is changed, even although the temperature of the optical disc 11 remains constant. Therefore, the size of the reproducing region may be maintained constant by controlling the laser power depending on temperatures even although the temperature of the optical disc 100 is changed.

ROM 21 stores a table for laser power setting reference values REF corresponding in a one-for-one relationship to minute temperature ranges, obtained by subdividing the temperature range of the magneto-optical disc 11 in accordance with the storage capacity of ROM 21. The reproducing laser power setting reference values REF associated with temperature ranges of the optical disc 100 which will give constant optimum sizes of the reproducing region are previously detected and the reproducing laser power setting reference values REF associated with these temperature ranges are written in ROM 21. Whether or not the size of the reproducing region is of a optimum constant size may be detected depending on whether or not the RF signal level from signal processor 15 is of the predetermined value when the information of the predetermined reference pattern is reproduced.

Thus the reproducing laser power setting reference values REF conforming to the temperatures of the optical disc 100 as sensed by temperature sensor 20 are perpetually read from ROM 21. The reproducing laser power setting reference values REF need not be changed continually. Thus an output from ROM 21 is latched by latch circuit 22 by a timing signal from timing signal generator 23 and he reproducing laser power setting reference value REF is changed at the time point of the timing signal. The setting reference values REF are changed e.. at the reproduction start point and at intervals of predetermined time, such as ten minutes, during reproduction, at which temperature changes are thought to be produced. Thus the timing signals are generated by timing signal generator 23 at the time of start of reproduction and at an interval often minutes since the reproduction start time.

In this manner, the size of the reproducing region may be maintained constant by controlling the laser power, even although the temperature of the variable reflectance type optical disc 100 is fluctuated with changes in the ambient temperature to assure stable reproduction at all times.

The embodiment of FIG. 9 may be modified in the same manner as when using the above-mentioned magneto-optical disc. For example, the disc rotating driving system may be CAV(Constant Angular Velocity) or CLV(Constant Linea Velocity). Besides, the intensity of the of the readout beam may be controlled based on the detected medium temperature, or the size of the portion where reflectance is changed may be detected based on the level of the signal read from the optical recording medium. The setting values may be found by processing instead of by using the ROM, while the disc surface temperature may be detected y and IR sensor instead of by detecting the ambient temperature of the disc.

As an example of the optical disc 100 of the variable reflectance type employed in the embodiment of FIG. 9, a phase change type disc is explained, in which a phase change material layer which may be crystallized after melting is used and in which, when the layer is irradiated with the readout beam, the layer of the phase change material is partially liquefied in a melt crystallization region in the readout beam spot to be changed in reflectance and is reverted to the crystal state after readout is terminated.

Figure 10:
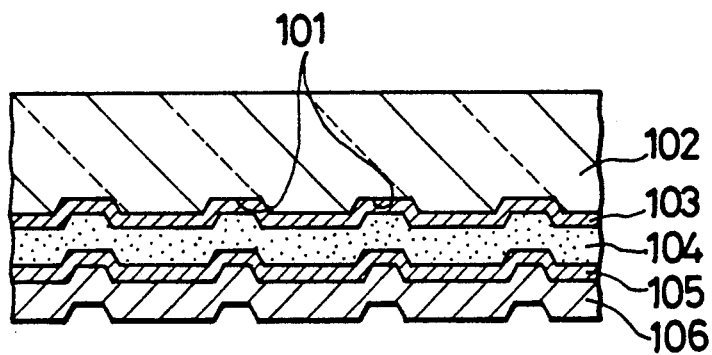
FIG. 10 is a schematic cross-sectional view showing essential parts of an example of a phase change type optical disc as typical of a variable reflectance optical disc employed in the embodiment shown in FIG. 9.

Referring to a schematic cross-sectional view of FIG. 10, the phase change type optical disc, used as the optical disc 100 shown in FIG. 9, a layer of a phase change material 104 is formed via a first dielectric layer 103 on a transparent substrate 102 on which phase pits are formed (on the lower side in the drawing), a second dielectric layer 105 is formed on the layer 104. (on the lower side in the drawing, hereinafter the same) and a reflective layer 106 is formed on the second dielectric layer. Optical characteristics, such as reflectance, are set by these first and second dielectric layers 103 and 105.

If necessary, a protective layer, not shown, may be additionally deposited on the reflecting layer 106.

Figure 11:
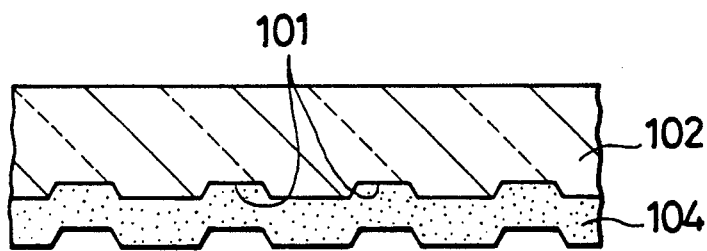
FIG. 11 is a schematic cross-sectional view showing another example of the phase change type optical disc.
Figure 12:
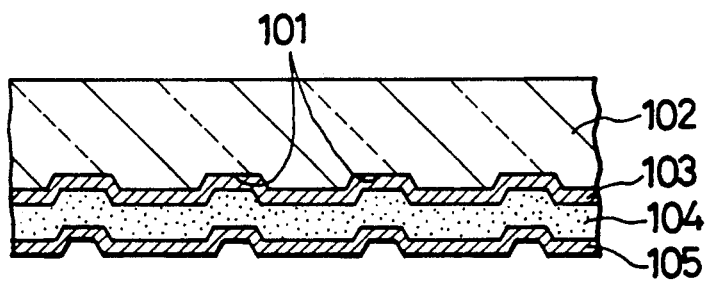
FIG. 12 is a schematic cross-sectional view showing still another example of the phase change type optical disc.

As alternative constitutions of the phase change type optical discs, only the phase change material 104 may be intimately deposited directly on the transparent substrate 102 on which pits are formed, as shown in FIG. 11, or the first dielectric layer 103, a phase change material layer 104 and a second dielectric layer 105 may be sequentially formed on the transparent substrate 102 on which phase pits are formed, as shown in FIG. 12.

The transparent substrate 102 may be a substrate of synthetic resin, such as a glass substrate, polycarbonate or methacrylate. Alternatively, a photopolymer layer may be deposited on the substrate and phase pits may be formed by a stamper.

The phase change material may be such materials which undergoes partial phase changes within a scanning spot of the readout beam and is reset after readout and the reflectance of which is changed with phase changes. Examples of the material include calcogenites, such as $Sb_2Se_3$, $Sb_2Te_3$, that is chalcogen compounds, other calcogenites or unitary calcogenites, that is calcogenitic materials, such as Se or The, calcogenites thereof, such as BiTe, BiSe, In-Se, In-Sb-The, In-SbSe, In-Se-Tl,Ge-The-Sb or Ge-The. If the phase change material phase 104 is constituted by chalcogen or calcogenite, its characteristics, such as heat conductivity or specific heat, may be rendered desirable in providing satisfactory temperature distribution by the readout beam. Besides, the melted state in the melt crystallized region as later explained may be established satisfactorily to generate ultra-high resolution with high S/N or C/N ratio.

The first dielectric layer 103 and the second dielectric layer 105 may be formed of, for example, $Si_3N_4$, SiO, $SiO_2$, AlN, $Al_2O_3$, ZnS or $MgF_2$. The reflective layer 106 may be formed of Al, Cu, Ag or Au, admixed with minor amounts of additives, if desired.

As a concrete example of the phase change type optical disc, an optical disc having an arrangement shown in FIG. 10 is explained. With this optical disc, a layer of a material which may be crystallized on being melted is formed on a transparent substrate on which phase pits are formed. When a readout beam is radiated, the layer of the phase change material is partially liquefied in a melted and crystallized region within the readout scanning beam spot and is reset after readout o a crystallized state.

A so-called glass 2P substrate was used as the transparent substrate 102. Phase pits 101 formed on a major surface of the substrate 102 were of track pitch of 1.6 μm, a pit depth of about 1200 Å and a pit width of 0.5 μm. A first dielectric layer 103 of AlN was deposited on one major surface of the transparent substrate 102 having these pits 101, to a thickness of 900 Å, and a layer of a phase change material 104 of $Sb_2Se_3$ was deposited on the layer 103 on the lower surface thereof in FIG. 10, hereinafter the same). A second dielectric layer 105 of AlN was deposited thereon and an Al reflective layer 106 was deposited thereon to a thickness of 300 Å.

The following operation was performed on a portion of the optical disc free from recorded signals, that is a mirror-surface part thereof free from phase pits 101.

A laser beam of e.g. 780 nm was radiated to be focused on a point of the optical disc which was then initialized by being allowed to cool gradually. The same point was then irradiated with a laser pulse with a laser power P set to $0 < P \leq 10$ mw. The pulse width was set to $260 \text{ nsec} \leq t \leq 2.6 \text{ μsec}$. The result is that, if the reflectance is changed between two solid phase states before pulse irradiation and after pulse irradiation followed by cooling to room temperature, the layer is changed from a crystal state to an amorphous state. if the reflectance is not changed during this operation, but the amount of return light is once changed during irradiation of the pulse beam, it is an indication that the film of the crystal state is once liquefied and again crystallized. The region in the melted state which has once become liquid and which may be returned to the crystallized state with lowering of temperature is termed a melted and crystallized region.

Figure 13:
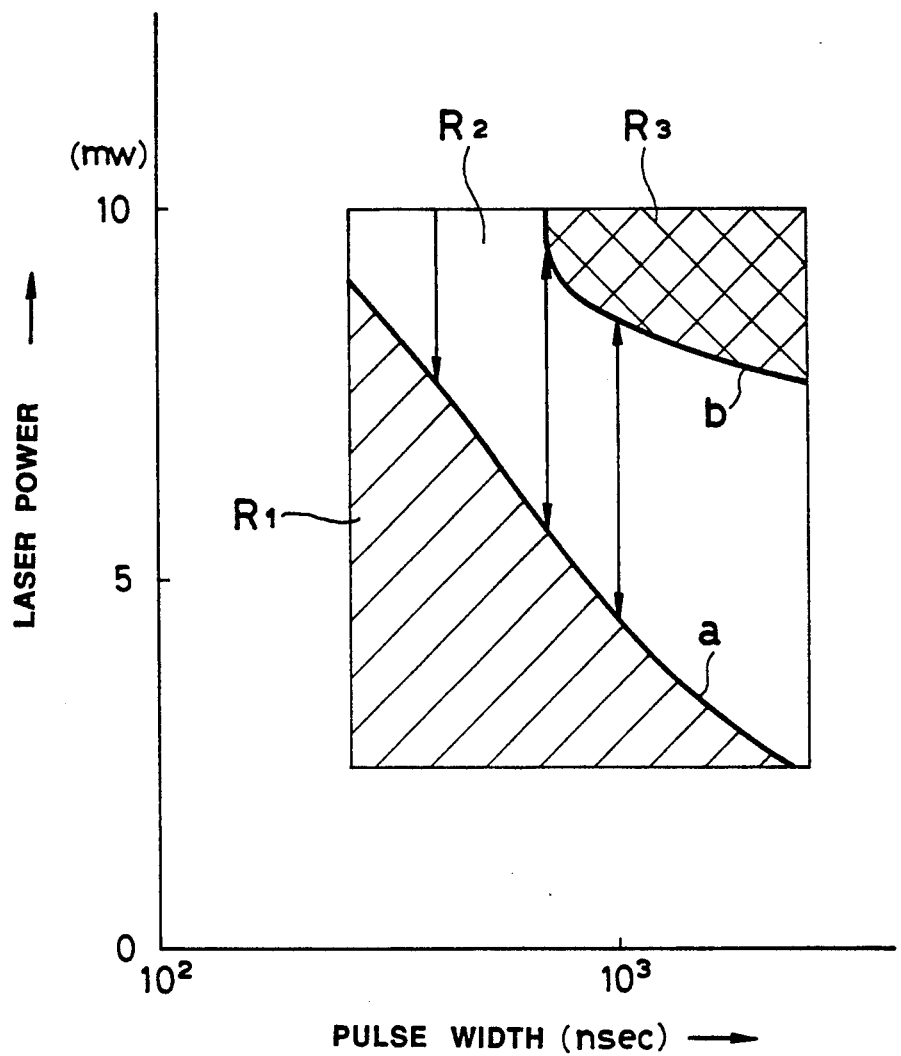
FIG. 13 is a view showing a phase change state for explanation of the above-mentioned phase change type optical disc.

FIG. 13 shows the phase states of the layer of the phase change material 104 of $Sb_2Se_3$ and values of a pulse width of the radiated laser pulse plotted on the abscissa and the laser beam power plotted on the ordinate. In this figure, a hatched area $R_1$ below a curve a indicates a region in which the layer of the phase change material 104 is not melted, that is maintained in its initial state. In this figure, the region above curve a becomes liquid, that is melted, on laser beam spot irradiation. A region between curves a and b is a melted and crystallized region which is reset to a crystal state when cooled to about the ambient temperature by elimination of the laser beam spot and thereby turned into a solid phase. Conversely, a hatched region $R_3$ above curve b is a melted amorphous region which is rendered amorphous when cooled and turned into a solid phase by elimination of the laser light spot.

In the present embodiment, the reproducing laser power, optical disc constitution, material and the film thicknesses are selected so that, in the course of cooling to ambient temperature from the heated state caused by readout beam irradiation during reproduction, the time Δt which elapses since the heated state brought about by irradiation of the readout beam during reproduction until cooling to ambient temperature becomes longer than the time necessary for crystallization, so that the state of liquid phase in the melted and crystallized region $R_2$ in FIG. 13 will be produced during reproduction.

In the present embodiment, the reflectance in the initial state, that is in the crystallized state, was 57%, whereas that in the melted state was 16%. When reproduction was performed with the playback power of 9 mW and the linear velocity of 3 m/sec, the ratio C/N was 25 dB.

Figure 14:
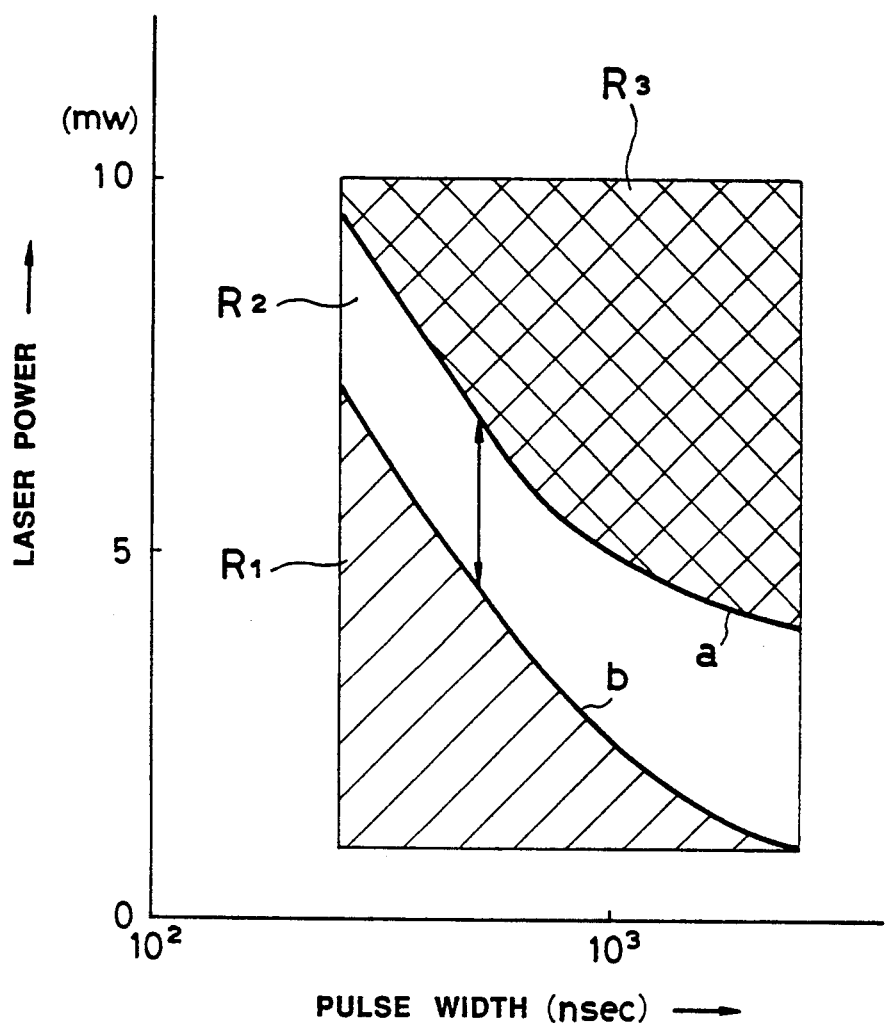
FIG. 14 is a view showing another phase change state for explanation of the above-mentioned phase change type optical disc.

FIG. 14 shows the results of measurement of the phase change states for another example of the phase change type optical disc making use of $Sb_2Te_3$ as a phase change material 104, similarly to FIG. 13. In FIG. 14, the parts corresponding to those of FIG. 13 are indicated by the same reference numerals. In the present example, making use of $Sb_2Te_3$, the reflectance in the crystallized state, that is initial state, wa 20%, while that in the melted state was 10%.

Meanwhile, with calcogenites or chalcogens, such as $Sb_2Se_3$ or $Sb_2Te_3$, the reflectance for the amorphous state is substantially equal to that in the melted state. The optical disc employed in the present embodiment is reproduced with an ultra-high resolution by taking advantage of temperature distribution within the scanning spot on the optical disc.

Figures 15A, 15B:
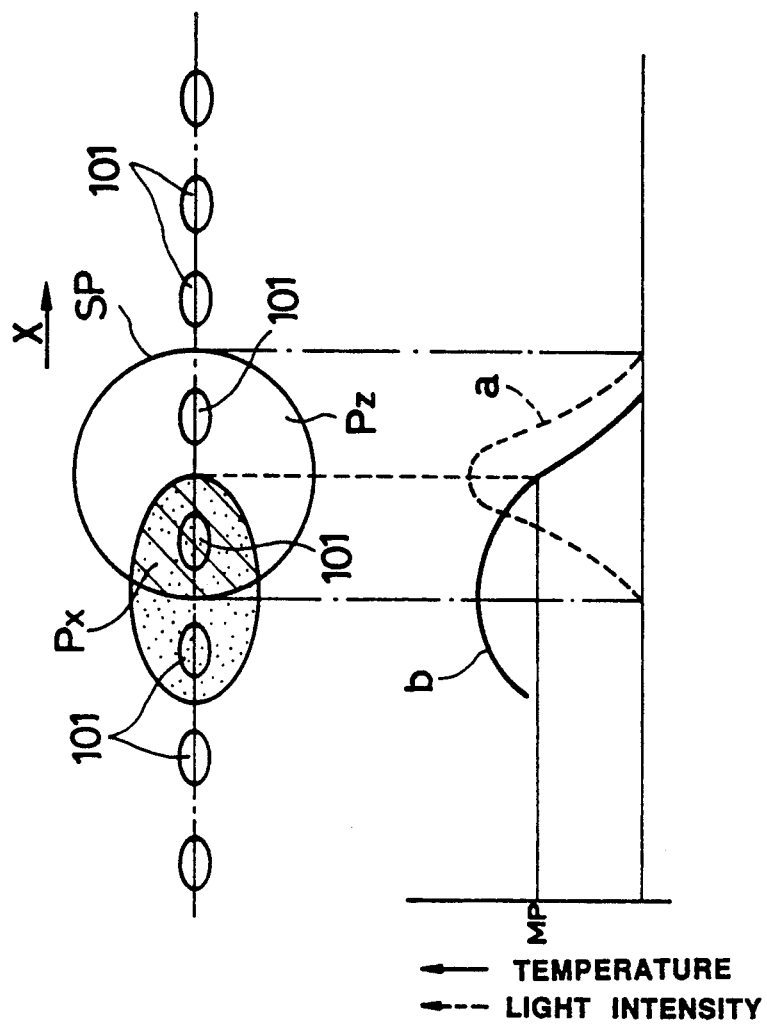
FIG. 15A and 15B are views showing the relation between the temperature distribution and a readout light spot for explanation of the above-mentioned phase change type optical disc.

Referring to FIG. 15, explanation is given of the case in which a laser beam is radiated on the phase change type optical disc.

In FIG. 15, the abscissa indicates a position of the beam spot relative to the scanning direction X. A beam spot SP formed on the optical disc on laser beam radiation has a light intensity distribution as indicated by a broken line a. On the other hand, temperature distribution in the layer of the phase change type material 104 is shifted slightly rearward relative to the beam scanning direction X, as indicated by a solid line b, in association with the scanning speed of the beam spot SP. If the laser light beam is scanned in the direction shown by arrow X, the optical disc as a medium is gradually raised in temperature, from the distal side relative to the scanning direction of the beam spot SP, until finally the temperature becomes higher than the melting point MP of the layer 104. In this stage, the layer 104 is in the melted state, from its initial crystal state, and is lowered in e.g. reflectance, as a result of transition to the melted state. The reflectance of a hatched region $P_x$ within the beam spot SP is lowered. That is, the region $P_x$ in which the phase pit 101 can hardly be read and a region $P_z$ remaining in the crystallized state exist within the beam spot SP. That is, even when two phase pits 101, for example, exist in one and the same spot SP as shown, it is only the phase pit 101 present in the high reflectance region $P_z$ that can b read, whereas the other phase pit 101 is present in the region $P_x$ with extremely low reflectance and hence cannot be read. In this manner, only the single phase pit 101 can be read even although plural phase pits 101 exist in the same spot SP.

Therefore, if the wavelength of the readout light beam is λ and the numerical aperture of the objective lens is NA, readout can evidently be made satisfactorily even with the shortest phase pit interval of the recording signals along the scanning direction of the readout light beam is not more than λ/2NA, so hat signals can be read with ultra-high resolution to increase the recording density, above all, the line density, and hence the recording capacity of the recording medium.

In the above embodiment, operating conditions, such as film thicknesses, are set so that the reflectance is low or high when the layer of the phase change material 104 is in the melted state or in the crystallized state, respectively. However, the thickness or the constitution of each layer or the phase change material may be so set that the reflectance becomes high or low in the melted state or in the crystallized state, respectively, in which case a phase pit may be present in the high temperature region $P_x$ in the laser beam spot SP shown in FIG. 15 so that only this phase pit in the high temperature region $P_x$ is read. In the case of an irreversible phase change in which a region is rased in temperature by laser beam irradiation to reach the melted and crystallized region $R_3$ such that it cannot be reset to the initialized state or crystallized state even if cooled to ambient temperature, it is only necessary to perform some initializing operation without departing from the scope of the present invention. For example, by radiating an elliptical spot after the reproducing laser spot for heating the layer 104 to the melted and crystallized region $R_2$, or by heating to a temperature lower than the melting point MP and nor lower than the crystallization temperature, the layer 104 may be initialized by being reset from the amorphous state to the crystallized state.

Although the reflectance is changed in the above embodiment by phase changes of the recording medium, the reflectance may be changed by taking advantage of any other phenomenon. Thus, for example, the reflectance may be changed by temperature by taking advantage of changes in spectral characteristics caused by moisture adsorption by an interference filter according to a modified embodiment shown in FIG. 16.

Figure 16:
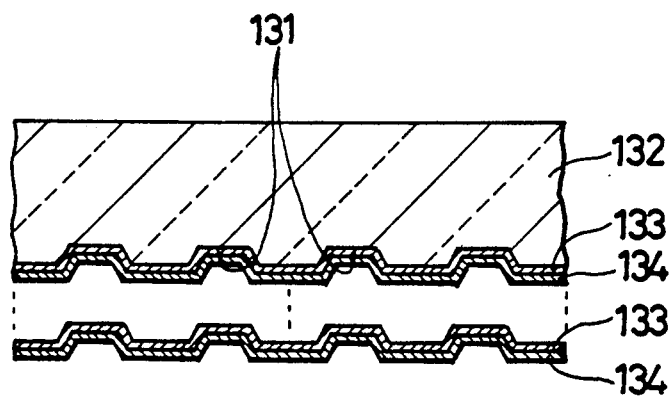
FIG. 16 is a schematic cross-sectional view showing essential parts of another example of the variable reflectance optical disc employed in the embodiment shown in FIG. 9.
Figure 17:
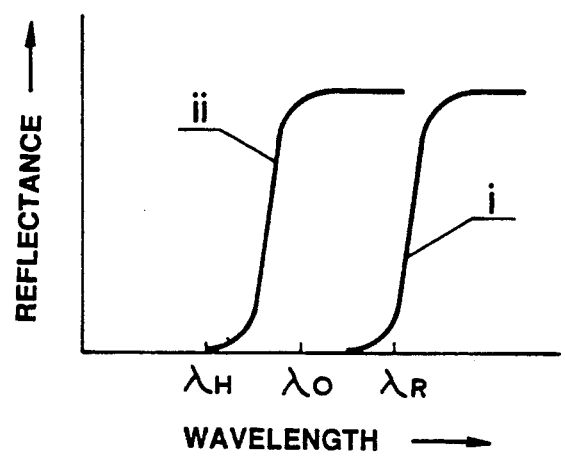
FIG. 17 is a graph showing the state of change in reflectance spectral characteristics with changes in temperature in an interference filter.

In the embodiment shown in FIG. 16, materials with markedly different refractive indices are repeatedly deposited on a transparent substrate 132, on which phase pits 131 are formed, to thicknesses equal to one fourths if the wavelength λ of the reproducing beam, for forming an interference filter. in the present embodiment, an MgF layer 133 (with a refractive index of 1.38) and an ZnS layer 134 (with a refractive index of 2.35) are used as the materials with markedly different refractive indices. However, any other combinations of the materials having larger differences in refractive indices may be employed. For example, SiO having a lower refractive index of 1.5 may be used as a low refractive index material, and $TiO_2$ with a refractive index of 2.73 or $CeO_2$ with refractive index of 2.35 may be used as a high refractive index material.

The above-mentioned MgF layer 133 or the ZnS layer 134 are deposited by evaporation. If the reached vacuum is set to a value of e.g. $10_{-4}$ Torr which is lower than a usual value, the film structure becomes porous to permit the moisture to be captured. With the interference filter formed by a film which thus has captured the moisture, the reflectance and spectral characteristics are changed markedly between the state in which the filter is at room temperature and the state in which the filter is heated to close to the boiling point of water. That is, an acute wavelength shift is observed, in which the spectral characteristics at room temperature are as shown by a curve i having a point of inflection at a wavelength $\lambda_R$ while the characteristics at approximately the boiling point are as shown by a curve ii having a point of inflection at wavelength $\lambda_H$ and returned to the characteristics shown by curve i on lowering the temperature. This phenomenon may be probably caused by acute changes in refractive index due to vaporization of the moisture resulting in changes in spectral characteristics.

Therefore, if the wavelength of the light source of the reproducing beam is selected to a wavelength $\lambda_O$ intermediate between these points of inflection $\lambda_R$ and $\lambda_H$, the reflectance is dynamically changed between the state of room temperature and the heated state.

In the present embodiment, high density reproduction is performed by taking advantage of these changes in reflectance. The mechanism of high density reproduction is described in connection with FIG. 15. In this case, the region in which the moisture is vaporized to produce wavelength shift corresponds to the high reflectance region, while the portion of the medium in which the temperature is not raised is the mask region. In the present embodiment, since the reflectance characteristics are reverted to the original state when the temperature is lowered, so that no particular erasure operation is required.

By using the reflectance change type optical disc as the optical disc 100 shown in FIG. 9, the size of the effective reproduction region (the higher reflectance region of the regions $P_x$ and $P_z$ in FIG. 15) may be rendered constant despite temperature changes of the optical disc 100, so that reproduction may be performed stably to assure high quality reproduction signals.

It is to be noted that the present invention is not limited to the above-described embodiments, but may be applied to, for example, a card- or sheet-shaped optical recording medium besides the disc-shaped recording medium.

What is claimed is:

1. A method for reproducing an optical recording medium comprising a recording layer and a reproducing layer, said recording and reproducing layers being magnetically coupled to each other in steady state, said method comprising rendering recorded data unreadable by extinguishing magentic coupling between the recording layer and the reproducing layer in a region the temperature of which is raised to a temperature higher than a predetermined temperature by irradiation of a readout laser beam during reproduction, and reading the recording information held by said recording layer in an area of an irradiated region other than the magnetic coupling extinguished region, characterized by detecting the temperature of a irradiated portion of said optical recording medium, and controlling the size of said magnetic coupling extinguished region based on the detected temperature.

2. The method as defined in claim 1 further comprising controlling the intensity of said readout beam based on the detected temperature of said recording medium.

3. The method as defined in claim 1 further comprising controlling the size of the magnetic coupling extinguished region based on the level of the signal read out from said reproducing layer.

4. A method for reproducing an optical recording medium comprising a recording layer and a reproducing layer, said method comprising the steps of aligning domains of said reproducing layer, transcribing the recording information held by said recording layer in a region of the recording medium in which the temperature is raised to a temperature higher than a predetermined temperature by irradiation of a readout beam during reproduction for relieving the transcribed recording information by rendering said recording information readable, within a relieved region, and reading out the recording information from said relieved region of said reproducing layer, characterized by detecting the temperature of an irradiated portion of said optical recording medium, and controlling the size of said relieved region based on the detected temperature.

5. The method as defined in claim 4 further comprising impressing a reproducing magnetic field when transcribing and relieving the recording information held by said recording layer during reproduction to said reproducing layer, and controlling the intensity of the reproducing magnetic field based on the detected temperature of the recording medium.

6. The method as defined in claim 4 further comprising controlling the size of said relieved region based on the level of a signal read from said reproducing layer.

7. A method for reproducing an optical recording medium having phase pits formed thereon in accordance with signals and having its reflectance changed with temperature, said method comprising radiating a readout beam to the recording medium, and reading out said phase pits while partially changing the reflectance within a scanning spot of a readout beam, characterized by detecting the temperature of an irradiated portion of said optical recording medium, and controlling the size of a portion within the scanning spot of the readout beam in which reflectance is changed depending on the detected temperature.

8. The method as defined in claim 7 further comprising controlling the intensity of said readout beam based on the detected temperature of said recording medium.

9. The method as defined in claim 7 further comprising controlling the size of said portion in which reflectance is changed depending on the level of the signal read out from said optical recording medium.

* * * * *